United States Patent Office 3,243,375

Patented Mar. 29, 1966

3,243,375

PRECIPITATION PROCESS FOR PREPARING ACICULAR MAGNETIC METAL OXIDE PARTICLES

Johannes C. Jeschke, Stamford, Conn., assignor to Minnesota Mining and Manufacturing Company, St. Paul, Minn., a corporation of Delaware No Drawing. Filed Nov. 7, 1962, Ser. No. 236,116
3 Claims. (Cl. 252—62.5)

This invention relates to magnetic compositions and more particularly to the preparation of magnetic oxides.

It is known that improved magnetic oxide particles can be prepared by doping, that is, incorporating into the magnetic powder greater or small amounts of oxides of bivalent metals such as nickel, cobalt, molybdenum, manganese, zinc and the like. These additive agents confer improved magnetic properties upon the final magnetic compositions.

In a process known heretofore to produce useful results in the preparation of magnetic oxide particles which are especially useful for production of magnetic record material, it has been proposed to precipitate aqueous solutions of iron salts with the addition of cobalt, nickel or other metallic salts, using an alkali metal hydroxide or ammonium hydroxide, and then to convert the resulting precipitate to the desired $\gamma$-$Fe_2O_3$ (magnetic iron oxide) particles in the usual way. These particles are used (with appropriate binders) to coat appropriate sheet material, for example, polyethylene terephthalate, cellulose acetate or other films, which can be slit or cut to form magnetic recording media. While magnetic oxides consisting of spherical particles may in this way be produced which have somewhat higher coercivity than $\gamma$-$Fe_2O_3$ alone, these particles have a high thermal remanence decay, i.e. large change in remanent magnetization with change in temperature.

It is an object of this invention to provide an improved process for the precipitation of iron salts from solution in conjunction with cobalt or other adjuvant doping materials.

It is another object of the invention to provide a process whereby acicular, doped magnetic iron oxide particles of predetermined shape can be obtained.

A further object of the invention is to provide a process for the production of acicular particles of iron oxide containing additive metal oxides.

Still another object of the invention is to provide acicular cobalt-doped iron oxide of improved thermal stability.

Other objects of the invention will be apparent from the disclosures hereinafter made.

In accordance with the above and other objects of the invention, it has been found that by precipitation of an aqueous solution of sulfates or iron and additive metals with an alkali metal thiosulfate or ammonium thiosulfate, and while heating at a temperature in the range of about 50–80° C., followed by oxidation to non-magnetic oxide, reduction and reoxidation, acicular particles of doped magnetic $\gamma$-$Fe_2O_3$ of desirable size and of uniform size distribution are produced.

The magnetic oxide powders produced by the process of the invention have significantly higher coercivity than was heretofore found to be possible in the case of normal acicular $\gamma$-$Fe_2O_3$ together with a desirable ratio of remanence to saturation ($B_r/B_s$). Furthermore, these particles can be aligned when they are used to coat a magnetic recording medium, which provides a more uniform, continuous coating.

Broadly speaking, the process of the invention is carried out by preparing a solution in water of ferrous sulfate and selected adjuvant metal salt or salts, and warming to a temperature in the range of about 50–80° C. An aqueous solution of sodium thiosulfate is then added. While maintaining the temperature of the mixture, there is added an aqueous solution of an oxidizing agent, e.g. potassium iodate, to oxidize the ferrous iron and coprecipitate it with the doping metal as a doped, monohydrated ferric oxide.

The chemical equations which illustrate the reaction from the standpoint of the iron salts are as follows:

$$2FeSO_4+4Na_2S_2O_3+KIO_3+6H_2O \rightarrow 2Fe(OH)_3 +KI+2Na_2SO_4+2Na_2S_4O_6+3H_2O$$

$$2Fe(OH)_3 \rightarrow 2FeOOH+2H_2O$$

$$2FeOOH=Fe_2O_3.H_2O$$

If desired, the thiosulfate solution and iodate solution can be added together to the ferrous sulfate-adjuvant metal salt solution; preferably, however, the addition of these agents is made separately. The precipitate which forms is removed, as by filtration, and washed by decantation a number of times to remove soluble ions. The resulting non-magnetic powder is reduced to form $Fe_3O_4$, e.g. with carbon monoxide at about 350–400° C., and this is further oxidized in air or oxygen to doped magnetic $\gamma$-$Fe_2O_3$.

The concentration of the salts in the aqueous solution intended for precipitation is not critical. Concentrations of about 0.25 to 1 mole/liter can be used. The solubility of the salts of course limits the maximum concentration. Conveniently, a molar concentration of about 0.35 mole per liter is employed; a preferred range of salt concentration is of the order of 0.35 to 1.0 mole per liter.

A buffer salt, such as an amount of ammonium chloride or the like, may be used if desired to keep the pH of the solution somewhat acidic.

Additive metals which are known to change the magnetic properties of $\gamma$-$Fe_2O_3$ include metals such as nickel, cobalt, copper and the like. Soluble salts of these metals are useful in the process of the invention and produce acicular doped $\gamma$-$Fe_2O_3$ particles as described herein.

An amount of additive metal salt such as cobalt nitrate, cobalt sulfate, nickel sulfate or the like, sufficient to produce the desired concentration of additive in the range of about one-tenth to about 10 atom percent based on the amount of iron present, is added to the aqueous solution.

While potassium iodate is a convenient oxidizing agent for the mixed salts in solution, other soluble oxidizing agents having oxidation-reduction potential of the order of that of potassium iodate, i.e.—1.085 volts, are also useful.

The non-magnetic powder obtained from the precipitation step is then reduced to $Fe_3O_4$ by conventional methods, as by heating in an atmosphere of carbon monoxide.

The oxidation of the black, doped magnetic $Fe_3O_4$ can be conducted in the usual manner known to the art for the production of magnetic oxides, as, for example, in air or in a stream of oxygen, at temperatures which do not exceed about 550° C. Lower temperatures will require longer times of oxidation, and as a practical matter, it is found convenient to carry out the oxidation at a temperature in the range of about 250–400° C., to produce the acicular, doped magnetic oxide. Acicular particles, substantially uniform in each batch and ranging from about 0.1 micron or less up to 1 micron in their largest dimension, can be obtained.

The following examples will more specifically illustrate the process of the invention.

EXAMPLE 1

A solution is prepared consisting of 31.85 grams of $FeSO_4.7H_2O$ and 7.5 grams of ammonium chloride in 500 ml. of water. To this solution is added 22.5 ml. of a one normal solution of cobalt sulfate. The pH of this mixture is between pH 5 and 6. To the mixture is added slowly, while stirring and heating at about 65° C., a solution of 63.7 g. of sodium thiosulfate in 500 ml. of water, followed by dropwise addition of a solution of 14.5 g. of potassium iodate in 250 ml. of water, while continuing the heating and stirring. After all of the potassium iodate solution has been added, heating and stirring are continued for about one hour longer, the temperature being maintained at about 65° C. as before.

The resulting yellow precipitate of hydrated ferric oxide doped with cobalt is removed from the aqueous medium by filtering, and is then washed free of sulfate ions with distilled water. The washed precipitate is dried in an oven about 100° C. The dried material is placed in a tube furnace and converted to black magnetic $Fe_3O_4$ by reduction with carbon monoxide. The powder is spread in an even layer in the furnace, and while heating to about 270° C. for about 3 hours, carbon monoxide is passed through the tube. By increasing the temperature to 360° C., the reduction is accomplished in a much shorter time, of the order of 30 minutes. The resulting reduced material is pyrophoric, and if stored, precautions are taken to prevent uncontrolled oxidation. For example, the powder can be stored under benzene.

The magnetic $Fe_3O_4$ is reoxidized by heating in air at about 280° C. for about 2 hours. Higher temperatures, up to 400° C., can be used and an optimization of magnetic properties is found at the higher temperatures. The resulting reddish brown powder is cubic $\gamma$-$Fe_2O_3$, doped with cobalt, and the crystals are acicular. The length-width ratio of the particles is found upon inspection of electron photomicrographs to be a ratio of about 5 to 1. The particles are about 0.2 micron long and about 0.04 micron in width.

The magnetic properties are found to be as follows: $B_s$=2940; $B_r$=1800; $H_c$=413 oersteds.

The particles produced by the process of the invention are of extremely small size. They ordinarily have a length of the order of about 0.2 micron and the ratio of the length of the particles to their width ranges from about 7 to 1 to 5 to 1.

EXAMPLE 2

The procedure set forth in Example 1 is employed to produce a number of lots of acicular, cobalt-doped particles according to the invention. Various quantities of the ingredients are employed and the pH of the solution is varied. The temperature of making the precipitation is 60° C. in all cases. In some cases, the addition of the potassium iodate oxidizing solution is made subsequent to the addition of the sodium thiosulfate solution; in all other cases, the two solutions are added simultaneously to the solution of iron and cobalt sulfates.

Undoped lot H serves as a control to show the difference in coercivity achieved by the doped, acicular particles.

The following table shows the amounts of the ingredients employed and the conditions, and reports the magnetic properties of the resulting oxides. All of these were acicular and had particle sizes of the order of about 0.2 micron in their longest dimensions.

*Table 1*

| Lot | $FeSO_4.7H_2O$, grams | $CoSO_4.7H_2O$, grams | Mole conc'n of salts | NH4Cl,[a] grams | $NaS_2O_3$, ml. of 1% solution |
|---|---|---|---|---|---|
| A | 90 | 10.1 | 0.24 | 21.5 | 750 |
| B | 90 | 10.1 | 0.24 | 10 | 800 |
| C | 90 | 10.1 | 0.36 | 10 | 750 |
| D | 90 | 10.1 | 0.36 | 10 | 750 |
| E | 95 | 5.05 | 0.36 | 10 | 750 |
| F | 92.5 | 7.5 | 0.36 | 10 | 750 |
| G | 91.6 | 8.6 | 0.36 | 10 | 750 |
| H | 100 | 0 | 0.36 | 10 | 750 |

| Lot | $KIO_3$, ml. of 0.25% solution | pH | Mixing time after precipitation, minutes | Reduction temperature, ° C. | Reoxidation temperature, ° C. |
|---|---|---|---|---|---|
| A | 750 | 6.8 | 30 | 300 | 280 |
| B | 800 | 7.4 | 30 | 300 | 280 |
| C | 750 | 6.9 | 60 | 300 | 280 |
| D | 750 | 6.9 | 60 | 360 | 280 |
| E | [b] 750 | 6.9 | 60 | 400 | 280 |
| F | [b] 750 | 6.9 | 60 | 400 | 500 |
| G | [b] 750 | 6.9 | 60 | 400 | 700 |
| H | [b] 750 | 6.9 | 60 | 300 | 280 |

| Lot | $\sigma_s$ | $B_s$ | $\sigma_r$ | $B_r$ | $\sigma_r/\sigma_s$ | $H_c$ |
|---|---|---|---|---|---|---|
| A | 46.6 | 2,770 | 21.3 | 1,270 | 0.47 | 375 |
| B | 58.0 | 3,450 | 24.5 | 1,450 | 0.42 | 344 |
| C | 65.0 | 3,860 | 28.5 | 1,700 | 0.44 | 435 |
| D | 63.0 | 3,900 | 38.4 | 2,400 | 0.61 | 885 |
| E | 65.8 | 3,900 | 37.0 | 2,200 | 0.56 | 575 |
| F | 72.3 | 4,300 | 49.8 | 2,960 | 0.69 | 762 |
| G | 71.0 | 4,200 | 44.0 | 2,440 | 0.62 | 775 |
| H | 65.0 | 3,850 | 28.0 | 1,660 | 0.43 | 225 |

[a] Buffer.
[b] Added subsequent to the addition of $Na_2S_2O_3$ solution.

For comparison of the decay in remanence caused by heating of spherical cobalt-doped $\gamma$-$Fe_2O_3$ and acicular cobalt-doped $\gamma$-$Fe_2O_3$ of the invention, samples of lots D and H were magnetically saturated at room temperature (about 25° C.) and then heated to higher temperatures. The remanent flux was measured and the results are set forth as follows, flux values found at the increased temperatures being set forth in terms of percent of the original flux value.

*Table 2*

| | Percent remanent flux | | |
|---|---|---|---|
| Temperature, ° F. | 100 | 160 | 200 |
| Lot D | 98 | 92 | 86.5 |
| Lot H | 95 | 86 | 77 |

EXAMPLE 3

The same procedure was followed as in Example 2, using manganese chloride instead of cobalt sulfate. Several runs were made and results obtained are indicated in the following table. The particles of manganese-doped $\gamma$-$Fe_2O_3$ were acicular.

*Table 3*

| Lot | I | J | K |
|---|---|---|---|
| $FeSO_4.7H_2O$, g | 95 | 90 | 95 |
| $MnCl_2.4H_2O$, g | 3.5 | 3.5 | 3.5 |
| $NH_4Cl$, g | 10 | 10 | 10 |
| $Na_2S_2O_3$, ml.[a] | 750 | 750 | 750 |
| $KIO_3$, ml.[b] | 750 | 750 | 750 |
| pH | 6.9 | [c] 7.5 | [d] 8.0 |
| Reduction temp. ° C | 330 | 360 | 360 |
| Reoxidation temp. ° C | 280 | 280 | 280 |
| $\sigma_s$ | 58.0 | 59.5 | 72 |
| $\sigma_r$ | 18.2 | 22.3 | 21 |
| $\sigma_r/\sigma_s$ | 0.31 | 0.34 | .29 |
| $H_c$ | 225 | 225 | 200 |

[a] Solution contained 232 g. $Na_2S_2O_3.5H_2O$ in 935 ml. $H_2O$.
[b] Solution contained 50 g. $KIO_3$ in 935 ml. $H_2O$.
[c] 20 ml. of 0.1 N KOH added after addition of $KIO_3$ solution.
[d] 100 ml. 1 N KOH added before addition of $KIO_3$ solution.

What is claimed is:

1. In a process for the preparation of acicular magnetic particles of adjuvant metal-doped $\gamma$-$Fe_2O_3$ by coprecipitation of the mixed oxides of iron and doping metals from a salt solution of the metal ions, and reduction and reoxidation of non-magnetic mixed oxides of iron and doping metal, the step which comprises adding about 0.5 to 2 moles of thiosulfate of the class consisting of alkali metal thiosulfate and ammonium thiosulfate, and about 0.1 to 0.5 mole of alkali metal iodate, in aqueous solution, to an aqueous solution containing from about 0.25 to 1 mole per liter of ferrous sulfate and about 0.1 to 10 mole percent, based on the amount of iron, of water-soluble adjuvant metal salt, at a temperature in the range of about 50° to 80° C., to oxidize and coprecipitate the iron and adjuvant metal as hydrated non-magnetic mixed oxides.

2. In a process for the preparation of acicular magnetic particles of adjuvant metal-doped $\gamma$-$Fe_2O_3$ by coprecipitation of the mixed oxides of iron and doping metal from a salt solution of the metal ions, and reduction and reoxidation of non-magnetic mixed oxides of iron and doping metals, the step which comprises adding about 0.5 to 2 moles of sodium thiosulfate and 0.1 to 0.5 mole of potassium iodate, in aqueous solution, to an aqueous solution containing from about 0.25 to 1 mole per liter of ferrous sulfate and about 0.1 to 1 mole percent, based upon the amount of iron, of cobalt sulfate, at a temperature in the range of about 50° to 80° C., to oxidize and coprecipitate the iron and cobalt as hydrated, non-magnetic mixed oxides in acicular form.

3. In a process for the preparation of acicular magnetic particles of adjuvant metal-doped $\gamma$-$Fe_2O_3$ by coprecipitation of the mixed oxides of iron and doping metals from a salt solution of the metal ions, and reduction and reoxidation of non-magnetic mixed oxides of iron and doping metals, the step which comprises adding from about 0.5 to 2 moles of sodium thiosulfate and 0.1 to 0.5 mole of potassium iodate, in aqueous solution, to an aqueous solution containing from about 0.25 to 1 mole per liter of ferrous sulfate and about 0.1 to 10 mole percent, based upon the amount of iron, of manganese chloride, at a temperature in the range of about 50° to 80° C., to oxidize and coprecipitate the iron and manganese as hydrated, non-magnetic mixed oxides.

References Cited by the Examiner

UNITED STATES PATENTS

| | | | |
|---|---|---|---|
| 2,978,414 | 4/1961 | Harz et al. | 252—62.5 |
| 3,047,505 | 7/1962 | Miller | 252—62.5 |
| 3,075,919 | 1/1963 | Gruber et al. | 252—62.5 |
| 3,117,933 | 1/1964 | Abeck et al. | 252—62.5 |

TOBIAS E. LEVOW, *Primary Examiner.*

MAURICE A. BRINDISI, *Examiner.*